United States Patent [19]

Young

[11] 4,346,499
[45] Aug. 31, 1982

[54] DEVICE FOR SKINNING SMALL ANIMALS

[76] Inventor: Leroy Young, 969 Washington St., Franklinton, La. 70438

[21] Appl. No.: 234,652

[22] Filed: Feb. 17, 1981

[51] Int. Cl.³ .............................................. A22B 1/00
[52] U.S. Cl. ..................................... 17/44.3; 294/79
[58] Field of Search ................... 17/44, 44.2, 44.3, 21, 17/11; 294/79; 248/62, 74 R; 211/89; 269/131, 132

[56] References Cited

U.S. PATENT DOCUMENTS

| | | | |
|---|---|---|---|
| 20,711 | 6/1858 | Hopkins | 269/131 X |
| D. 168,074 | 10/1952 | Symington . | |
| D. 257,665 | 12/1980 | Young . | |
| 949,900 | 2/1910 | Jackson | 269/131 X |
| 1,027,335 | 5/1912 | Heyerdahl | 294/79 |
| 1,311,779 | 7/1919 | Shank | 294/79 |
| 1,561,109 | 11/1925 | Platt et al. | 17/11 |
| 2,441,051 | 5/1948 | Wilhelm | 248/110 |
| 2,860,673 | 11/1958 | Rauseo | 269/132 X |
| 3,137,030 | 6/1964 | Varner | 17/44.2 |
| 3,188,130 | 6/1965 | Pietrowicz | 294/74 |
| 3,623,187 | 11/1971 | Grubbs | 17/21 |
| 4,306,696 | 12/1981 | Pondman | 248/62 |

Primary Examiner—Willie G. Abercrombie
Attorney, Agent, or Firm—David L. Ray

[57] ABSTRACT

A device for holding small animals in a position to be skinned including a backet having two legs extending outwardly therefrom, a slot located near the ends of each of the legs for receipt of an eyebolt, a U-shaped clamp which snaps onto the outside of the ends of the leg adjacent to the slot for receipt of the end of the eyebolt, and a nut for threading onto the end of the eyebolt.

10 Claims, 5 Drawing Figures

DEVICE FOR SKINNING SMALL ANIMALS

BACKGROUND OF THE INVENTION

The present invention relates to a device for skinning small animals and in particular to a device for suspending small animals by the legs while the animal is being skinned.

Many small game skinning devices and methods are known in the art. The following patents are relevant because they show either devices used in the skinning of animals or hanging devices in general: U.S. Pat. Nos. 1,027,335; 1,311,779; 1,561,109; 2,441,051; 3,137,030; 3,188,130; 3,623,187; Des. 168,074 and Des. 257,665.

THE INVENTION

In accordance with the present invention there is provided a device for holding a small animal in a position to be skinned including a bracket having two legs extending outwardly therefrom, a slot located near the ends of each of the legs for receipt of an eyebolt, a U-shaped clamp which snaps onto the outside of the ends of said leg adjacent to said slot for receipt of the end of said eyebolt, and a nut for threadng onto the end of the eyebolt.

The skinning device of the invention is lightweight and inexpensive. The device is easy to operate and firmly secures an animal for skinning.

DESCRIPTION OF THE PREFERRED EMBODIMENTS

Figure 1:
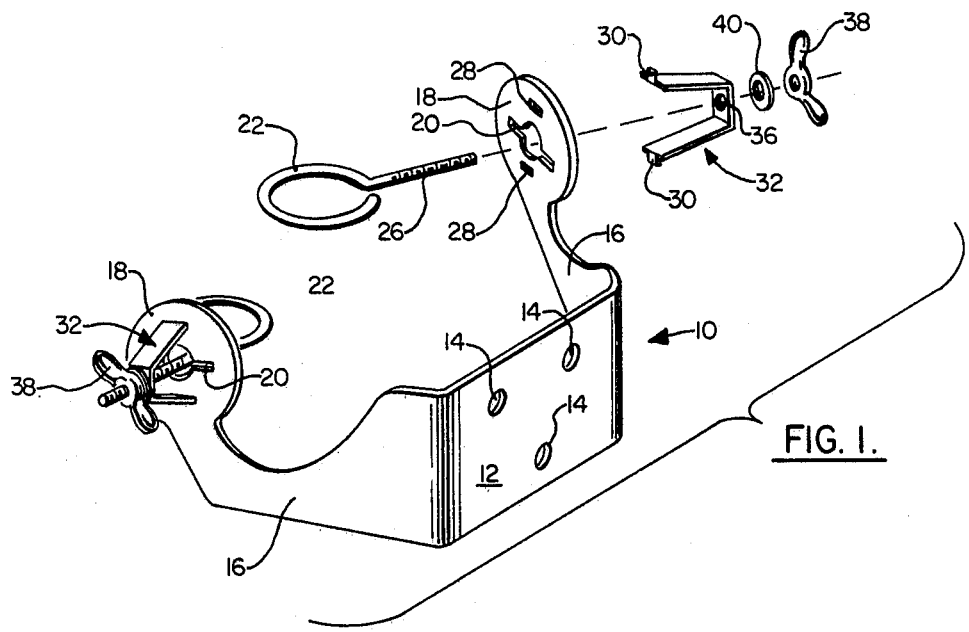
FIG. 1 is a perspective, partly exploded view of the present invention.
Figures 2, 4:
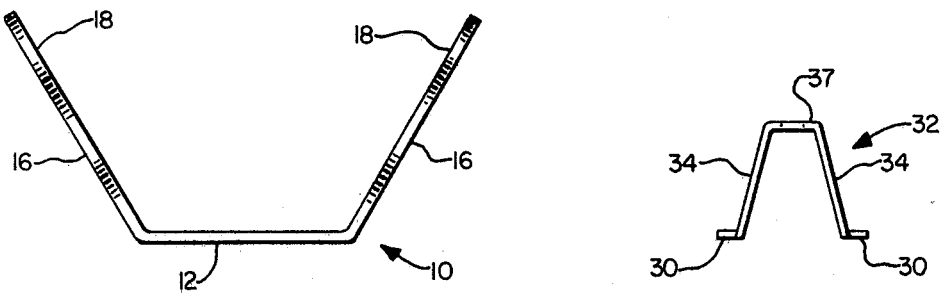
FIG. 2 is a top plan view of the bracket of the present invention.
FIG. 4 is a top plan view of the U-shaped clamp of the present invention.
Figure 3:
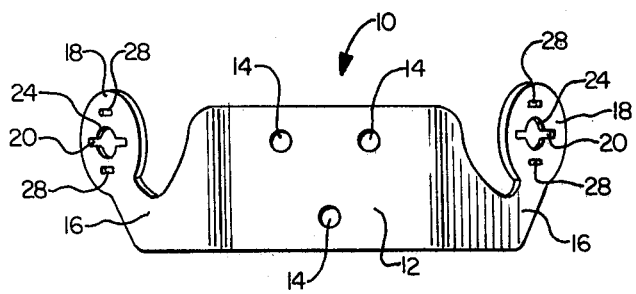
FIG. 3 is a back view of the bracket of the present invention.

Referring now to the drawings, in FIGS. 1, 2 and 3 is shown a bracket, generally indicated by the numeral 10. Bracket 10 includes a base plate 12 which has a series of holes 14 therein so that base plate 12 can be firmly affixed to a stationary object such as a board, a wall of a building, or a tree. Nails or screws may be inserted through holes 14 to fasten bracket 10 rigidly to such objects.

Extending outwardly from base plate 12 and integrally formed therewith are two legs 16—16. Legs 16—16 terminate in outer ends 18—18. The outer ends 18—18 of legs 16—16 have slots 20—20 therein for receipt of eyebolts 22—22. The slots 20—20 are greater in length than the diameter of the eye or circular portion of eyebolt 22 so that eyebolts 22 may slide completely through slots 20—20 without jamming or striking the edges thereof. The center portion of slots 20—20 may be slightly larger if desired, as indicated at 24—24, to accommodate a threaded portion or bolt portion 26—26 of eyebolts 22 which may be larger in diameter than slots 20.

Figure 5:
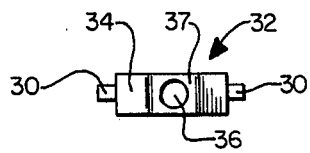
FIG. 5 is an end plan view of the U-shaped clamp of the present invention.

Also located in the outer end 18 of leg 16 are two shorter slots 28—28. Two of these slots are located in each outer end 18 of leg 16. Slots 28—28 are adapted to receive two feet 30—30 of the U-shaped clamps, generally indicated by the numeral 32 in FIGS. 1, 4 and 5. Clamps 32—32 have two legs 34—34 which extend outwardly to the feet 30—30 of the clamp and form an obtuse angle therewith. At the top of U-shaped clamp 32 is a generally flat portion 37 parallel to feet 30—30 having a hole 36 therein for receipt of the threaded portion of eyebolts 22.

Thus, it can be seen that U-shaped clamp 32 can be inserted into slots 28—28 by squeezing the legs 34—34 together, pushing the feet 30—30 into slots 28 and releasing the pressure on legs 34—34. As can be seen, the lower feet 30 are not as wide as legs 34 of U-shaped clamp 32. Also, slots 28 are just wide enough to receive feet 30. Thus, when U-shaped clamp 32 is placed into slot 28 it is held firmly in position and will not fall out.

Eyebolt 22 is held in place preferably by wing nut 38 and washer 40. It can thus be seen that U-shaped clamp 32 holds the eyebolt 22 in position on bracket 10 which may be varied by tightening wing nut 38 or loosening wing nut 38.

To operate the invention, U-shaped clamps 32 are placed in position in slots 28, eyebolt 22 is inserted through slot 20, hole 26, and washer 40, and wing nut 38 is threaded in place on the end of threaded portion 26 of eyebolt 22. Thus eyebolt 22 is secured loosely in position on the animal skinning device. The legs of the animal can then be inserted within the round portion of eyebolt 22 and wing nut 38 is tightened. As wing nut 38 is tightened the eyebolt 38 is drawn inwardly into slot 20 and presses the legs of the animal against the slot. An animal with very small legs can be secured since the eyebolt will completely recede within slots 20 if wing nut 38 is tightened sufficiently far enough.

Having fully described the preferred embodiments of the present invention, it is desired that it be limited only within the spirit and scope of the present claims.

What is claimed is:

1. A device for holding a small animal in position to be skinned, which device comprises:
   a. bracket means having leg means extending outwardly therefrom;
   b. first slot means located near the ends of said leg means for receipt of an eyebolt;
   c. U-shaped clamp means for snapping engagement with said ends of said leg means adjacent said first slot means for receipt of said eyebolt; and
   d. nut means for threading onto the ends of said eyebolt.

2. The device of claim 1 wherein said bracket means has a base plate means connecting said leg means.

3. The device of claim 2 wherein said base plate means has holes therein through which nails or screws may be inserted to fasten said bracket means to a stationary object.

4. The device of claim 1 wherein said first slot means is rectangular in shape.

5. The device of claim 4 wherein said first slot means has an enlarged, circular opening in the middle thereof.

6. The device of claim 1 wherein said U-shaped clamp has two feet which form an obtuse angle with the two legs of said U-shaped clamp.

7. The device of claim 6 wherein each of said ends of said bracket means have two second slot means therein for receipt of said feet.

8. The device of claim 7 wherein said U-shaped clamp has a flat portion in the middle thereof.

9. The device of claim 8 wherein said flat portion has a hole in the center thereof.

10. The device of claim 9 wherein said feet are smaller in width than the width of said legs of said U-shaped clamp.

* * * * *